(12) United States Patent
Shiohara

(10) Patent No.: US 10,412,332 B2
(45) Date of Patent: *Sep. 10, 2019

(54) IMAGE-CAPTURING DEVICE FOR GENERATING IMAGE-CAPTURE DATA

(71) Applicant: SEIKO EPSON CORPORATION, Tokyo (JP)

(72) Inventor: Ryuichi Shiohara, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/131,154

(22) Filed: Sep. 14, 2018

(65) Prior Publication Data

US 2019/0014282 A1  Jan. 10, 2019

Related U.S. Application Data

(60) Division of application No. 15/726,878, filed on Oct. 6, 2017, which is a continuation of application No.
(Continued)

(30) Foreign Application Priority Data

Jun. 16, 2010 (JP) ................................ 2010-136846

(51) Int. Cl.
*H04N 5/225* (2006.01)
*H04N 5/222* (2006.01)
(Continued)

(52) U.S. Cl.
CPC ............. *H04N 5/3765* (2013.01); *G09G 3/36* (2013.01); *H04N 5/23293* (2013.01);
(Continued)

(58) Field of Classification Search
CPC ..... H04N 1/00933; H04N 2201/04767; H04N 5/3765

See application file for complete search history.

(56) References Cited

U.S. PATENT DOCUMENTS 4,360,805 A   11/1982  Andrews et al.
5,617,113 A    4/1997  Prince
(Continued)

FOREIGN PATENT DOCUMENTS

EP       0678847 A1   10/1995
JP     05-191817 A    7/1993
(Continued)

*Primary Examiner* — Sinh Tran
*Assistant Examiner* — Selam T Gebriel

(57) ABSTRACT

An image-capturing device includes an image sensor outputting image-capture data of a subject for each predetermined unit, a first and second processors, and a display. The first processor receives the image-capture data, carries out a first processing for the image-capture data, and outputs first processing data. The second processor receives the first processing data, carries out a second processing for the first processing data, and outputs second processing data. The first processor starts the first processing after preparation of the image-capture data of the lowest necessary number of the predetermined unit for executing the first processing is finished. The second processor starts the second processing after preparation of the first processing data of the lowest necessary number of a predetermined unit for executing the second processing is finished. The display receives the second processing data and starts to display data of a single line based on the second processing data.

10 Claims, 7 Drawing Sheets

Related U.S. Application Data

15/397,905, filed on Jan. 4, 2017, now Pat. No. 9,813,650, which is a continuation of application No. 14/276,210, filed on May 13, 2014, now Pat. No. 9,571,737, which is a continuation of application No. 13/161,883, filed on Jun. 16, 2011, now Pat. No. 8,786,724.

(51) Int. Cl.

| | | |
|---|---|---|
| *H04N 5/376* | (2011.01) | |
| *H04N 5/232* | (2006.01) | |
| *G09G 3/36* | (2006.01) | |
| *H04N 5/374* | (2011.01) | |
| *H04N 5/04* | (2006.01) | |

(52) U.S. Cl.
CPC ....... *H04N 5/3741* (2013.01); *G09G 2310/08* (2013.01); *H04N 5/04* (2013.01)

(56) References Cited

U.S. PATENT DOCUMENTS

| | | | |
|---|---|---|---|
| 5,629,744 A | 5/1997 | Kawamura | |
| 6,133,900 A | 10/2000 | Esaki | |
| 7,710,468 B2 | 5/2010 | Uchida et al. | |
| 7,868,890 B2 | 1/2011 | Ludwin et al. | |
| 7,948,527 B2 | 5/2011 | Kim | |
| 8,937,673 B2 | 1/2015 | Shiohara et al. | |
| 9,159,297 B2* | 10/2015 | Shiohara | G09G 5/12 |
| 2003/0193574 A1 | 10/2003 | Tanimoto | |
| 2004/0257321 A1 | 12/2004 | Back et al. | |
| 2005/0052542 A1 | 3/2005 | Iwai et al. | |
| 2005/0184993 A1 | 8/2005 | Ludwin et al. | |
| 2005/0237429 A1 | 10/2005 | Grundmeyer et al. | |
| 2005/0280715 A1 | 12/2005 | Asada | |
| 2007/0097104 A1 | 5/2007 | Kuroki | |
| 2007/0146810 A1 | 6/2007 | Kubo et al. | |
| 2007/0153028 A1 | 7/2007 | Nah et al. | |
| 2007/0211153 A1* | 9/2007 | Uchida | H04N 5/23293 348/231.99 |
| 2008/0151070 A1 | 6/2008 | Shiozawa et al. | |
| 2008/0180541 A1 | 7/2008 | Yonemitsu | |
| 2008/0316331 A1 | 12/2008 | Jun | |
| 2009/0047010 A1 | 2/2009 | Yoshida et al. | |
| 2009/0167888 A1 | 7/2009 | Noh | |
| 2010/0201874 A1 | 8/2010 | Kawana et al. | |
| 2010/0231742 A1 | 9/2010 | Yanada et al. | |

FOREIGN PATENT DOCUMENTS

| | | |
|---|---|---|
| JP | 06-245115 A | 9/1994 |
| JP | 07-294883 A | 11/1995 |
| JP | 2001-113039 A | 4/2001 |
| JP | 2004-165827 A | 6/2004 |
| JP | 2004-325821 A | 11/2004 |
| JP | 2005-079881 A | 3/2005 |
| JP | 2005-275357 A | 10/2005 |
| JP | 2006-262035 A | 9/2006 |
| JP | 2007-243615 A | 9/2007 |
| JP | 2007-295096 A | 11/2007 |

* cited by examiner

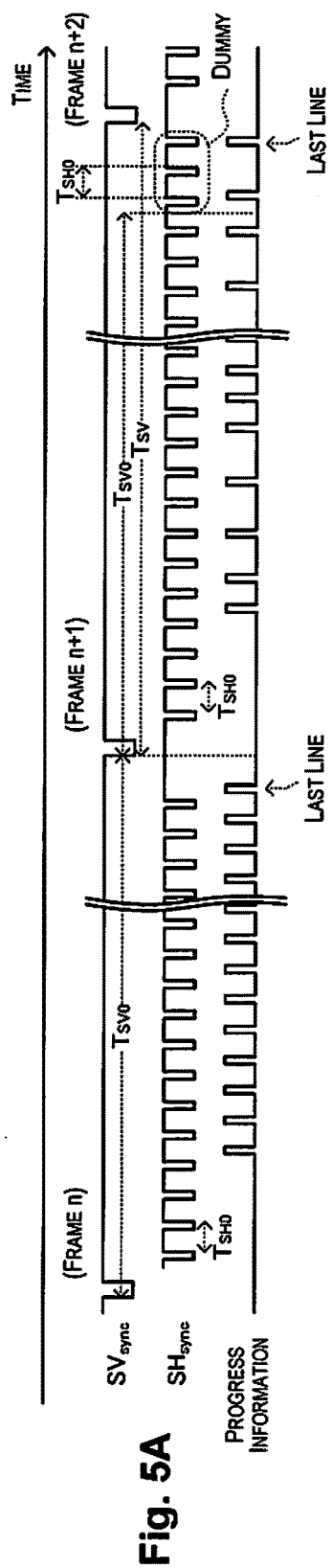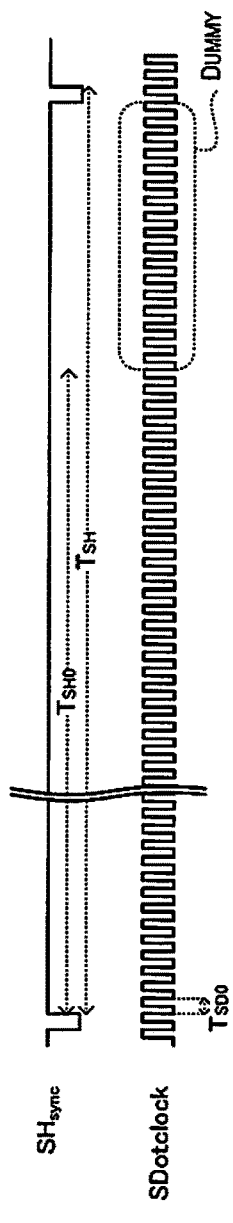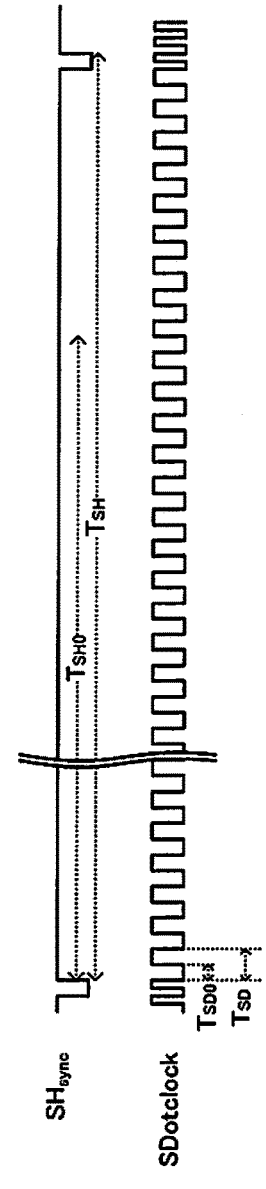
Fig. 5A
Fig. 5B
Fig. 5C

IMAGE-CAPTURING DEVICE FOR GENERATING IMAGE-CAPTURE DATA

CROSS-REFERENCE TO RELATED APPLICATIONS

This is a divisional application of U.S. patent application Ser. No. 15/726,878, which is a continuation application of U.S. patent application Ser. No. 15/397,905 filed on Jan. 4, 2017, now U.S. Pat. No. 9,813,650, which is a continuation application of U.S. patent application Ser. No. 14/276,210 filed on May 13, 2014, now U.S. Pat. No. 9,571,737, which is a continuation application of U.S. patent application Ser. No. 13/161,883 filed on Jun. 16, 2011, now U.S. Pat. No. 8,786,724. This application claims priority to Japanese Patent Application 2010-136846 filed on Jun. 16, 2010. The entire disclosures of U.S. patent application Ser. Nos. 15/397,905, 14/276,210, and 13/161,883 and Japanese Patent Application No. 2010-136846 are hereby incorporated herein by reference.

BACKGROUND

Technical Field

The present invention relates to an image-capturing device for displaying an image of a subject in a display section, and to a timing control circuit.

Related Art

Image-capturing devices that display on a liquid crystal display images that have been captured by an image sensor are known in the prior art, and various techniques have been developed for preventing displayed images displayed on a liquid crystal display from being delayed with respect to the actual subject. In Patent Citation 1, for example, a technique is disclosed whereby an image signal is read and displayed by a liquid crystal display before writing of the image signal of a single frame to the VRAM is completed in an image-capturing device provided with a VRAM for recording an image signal of a single frame. Specifically, a configuration is described in which image display by a liquid crystal display is started at a playback timing that is delayed by $\Delta T$ from the drive timing of the image sensor.

Japanese Patent Application Publication No. 2007-243615 (Patent Citation 1) is an example of the related art.

In the technique of Patent Citation 1, the cycle of the drive timing and the playback timing is the cycle for processing an image of a single frame, and a constant $\Delta T$ is defined for each frame. In other words, in the technique of Patent Citation 1, $\Delta T$ is described as being defined for each mode (Patent Citation 1, paragraph 0057), and $\Delta T$ is determined so that reading of image data does not take place before writing thereof (Patent Citation 1, paragraphs 0055 and 0056). Consequently, although $\Delta T$ may fluctuate for each mode, $\Delta T$ is a common value for each frame in the same mode, and the same phase difference $\Delta T$ is given for all lines of the image that is to be displayed.

However, in a configuration in which image processing for displaying the image of a subject in a display section is performed based on image-capture data of an image sensor, the period needed for each type of image processing may be different for each line. Therefore, in order to provide a common phase difference $\Delta T$ and thereby prevent the reading of image data from taking place before writing thereof in all the lines of the image that is to be displayed, $\Delta T$ must be defined so as to have a margin so that reading does not occur prematurely. For example, in defining $\Delta T$, it is necessary to make such considerations as assuming that the maximum period is needed for various types of image processing for all the lines. Consequently, in a configuration in which the period needed for image processing may fluctuate in line units, a delay may occur in line units in the period between capturing of the subject by the image sensor and displaying in the display section.

Also, because the period needed for image processing may differ for individual lines, the time needed for image processing of frames, which are collections of lines, may differ for individual frames. For example, in a live view mode whereby a moving picture is captured and displayed, whereas it is desirable for the frame rate of the image sensor to be as high as possible, it is undesirable for image data to be imported from the image sensor under conditions in which preparations are not in order for carrying out processing to generate the image data of the next frame (due to extension of the image data generation process of the current frame). The reason is that, depending on the mode of the image-data-generation section, problems such as, for example, overwriting or destruction of image data of lines for which the image data generation process is yet uncompleted may arise.

SUMMARY

With the foregoing problem in view, it is an advantage of some aspects of the invention optimizing the timing of the image data generation process.

According to an aspect of the invention, an image-capturing device includes an image sensor, a first processor, a second processor, and a display. The image sensor outputs image-capture data of a subject. The first processor receives the image-capture data, carries out a first processing for the image-capture data, and outputs first processing data. The second processor receives the first processing data, carries out a second processing for the first processing data, and outputs second processing data. The display receives the second processing data and displays based on the second processing data. The image sensor outputs the image-capture data for each predetermined unit. The first processor starts the first processing after preparation of the image-capture data of the lowest necessary number of the predetermined unit for executing the first processing is finished. The second processor starts the second processing after preparation of the first processing data of the lowest necessary number of a predetermined unit for executing the second processing is finished. The display starts to display data of a single line based on the second processing data.

BRIEF DESCRIPTION OF THE DRAWINGS

Referring now to the attached drawings which form a part of this original disclosure:

FIGS. 5A to 5C are timing charts of the signals applied to the area image sensor according to the present embodiment;

DETAILED DESCRIPTION OF EXEMPLARY EMBODIMENTS

Embodiments of the invention will be described in the following order.
(1) Configuration of the image-capturing device:
(2) Control of the horizontal synchronization signal:
(3) Control of signals applied to the area image sensor:
(4) Other embodiments:

(1) Configuration of the Image-Capturing Device

Figure 1:
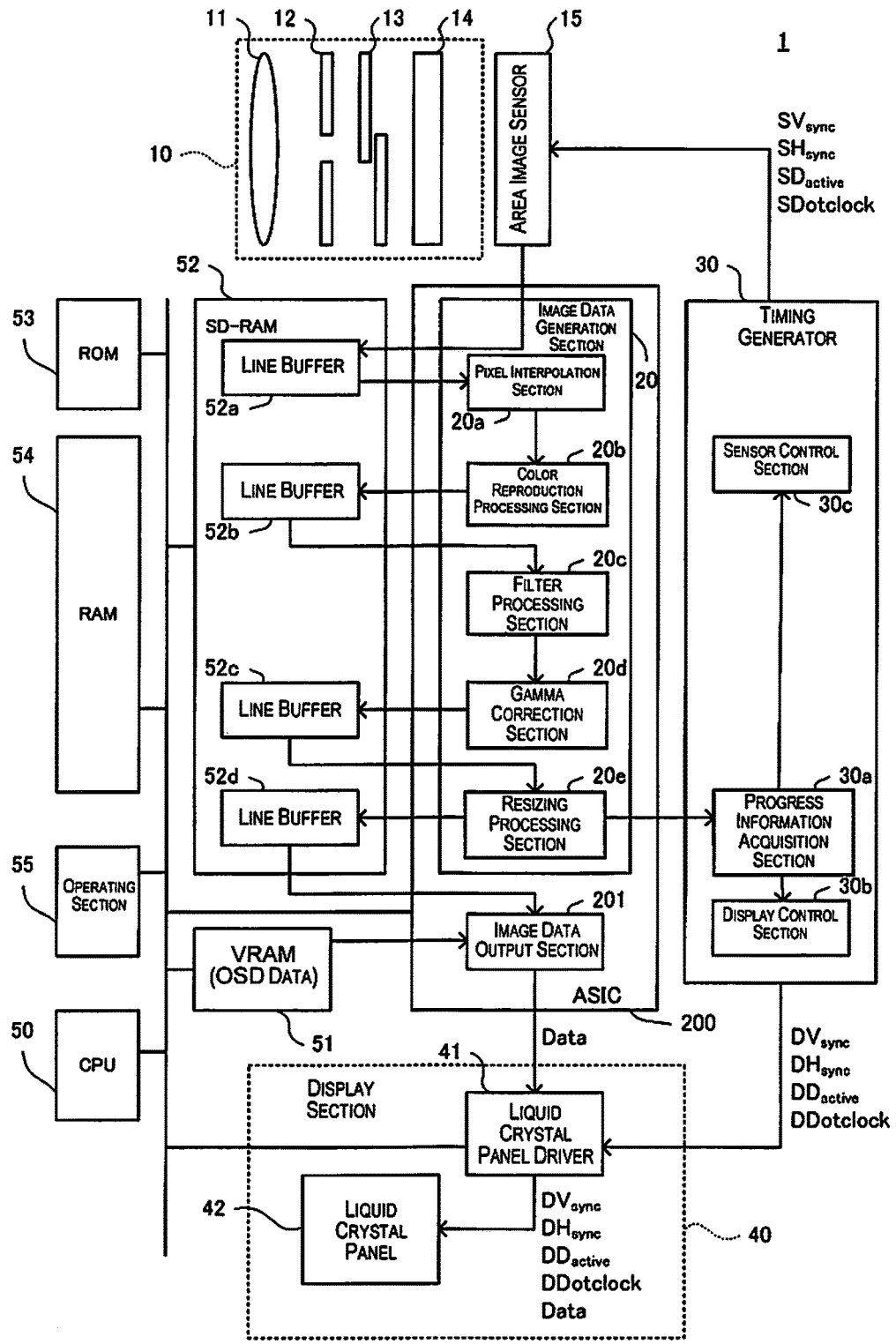
FIG. 1 is a block diagram according to an embodiment of the invention.

FIG. 1 is an image-capturing device 1 according to one embodiment of the invention. The image-capturing device 1 is provided with an optical system 10, an area image sensor 15, an ASIC 200, a timing generator 30, a display section 40, a CPU 50, a VRAM 51, an SD-RAM 52, a ROM 53, a RAM 54, and an operating section 55. The CPU 50 is capable of executing a program recorded in the ROM 53 by appropriately utilizing the VRAM 51, the SD-RAM 52, and the RAM 54, and through this program, the CPU 50 executes a function for generating image data which indicate a subject captured by the area image sensor 15, in accordance with an operation of the operating section 55. The operating section 55 is provided with a shutter button, a dial switch as a mode switching section for switching a mode, a dial switch for switching an aperture and a shutter speed, and a push button for operating various types of setting menus, and a user can issue various types of instructions to the image-capturing device 1 by operating the operating section 55.

The display section 40 is an EVF (electronic view finder) for displaying an image indicating a subject to be captured and allowing the user to comprehend the appearance of the subject prior to the capturing of the image, and image-capturing conditions and other information, and the image-capturing device 1 according to the present embodiment is a mirrorless digital camera provided with an EVF. The display section 40 is provided with an interface circuit not shown in the drawing, a liquid crystal panel driver 41, a liquid crystal panel 42, and an eyepiece lens and other components not shown in the drawing. In the present embodiment, the liquid crystal panel 42 is a high-temperature polysilicon TFT (Thin Film Transistor) provided with three sub-pixels corresponding to three colors of color filters for each pixel, and the positions of the pixels are prescribed by coordinates in an orthogonal coordinate system. A line is composed of a plurality of pixels aligned in the direction parallel to one coordinate axis, and a plurality of lines is aligned in the direction parallel to the other coordinate axis. In the present specification, the direction parallel to the lines is referred to as the horizontal direction, the direction perpendicular to the lines is referred to as the vertical direction, and a single screen composed of all the pixels of the liquid crystal panel 42 is referred to as a single frame.

The liquid crystal panel driver 41 applies a voltage to each sub-pixel and outputs a signal for driving the liquid crystals to the liquid crystal panel 42. The liquid crystal panel 42 is provided with a gate driver and a source driver not shown in the drawing, and performs display by a process whereby the gate driver controls the display timing in each pixel of each line in accordance with the signal outputted from the liquid crystal panel driver 41, and the source driver applies a voltage that corresponds to the image data of each pixel to each pixel of a line designated by the display timing. In other words, the liquid crystal panel driver 41 is configured so as to output various types of signals for performing display in the liquid crystal panel 42, e.g., a vertical synchronization signal (DVsync) for prescribing a period for display of a single frame; a horizontal synchronization signal (DHsync) for prescribing a period for display of a single line; a data active signal (DDactive) for prescribing a period for importing image data within each line; a data clock signal (DDotclock) for prescribing the import timing of image data of each pixel; and image data (Data) of each pixel.

The image-capturing device 1 according to the present embodiment is provided with the timing generator 30, and the vertical synchronization signal DVsync, the horizontal synchronization signal DHsync, the data active signal DDactive, and the data clock signal DDotclock are generated by the timing generator 30.

In other words, the timing generator 30 is provided with a display control section 30b which is provided with a division circuit or the like for generating a signal in which the signal level varies in synchrony with the variation timing of a clock signal having a predetermined cycle outputted from a clock signal generation section. By control of the display control section 30b, the timing generator 30 generates the vertical synchronization signal DVsync, data active signal DDactive, and data clock signal DDotclock in which the signal levels vary at a timing determined in advance. The output timing of the horizontal synchronization signal DHsync is variable in the present embodiment, and the output timing is determined depending on the processing result of a resizing processing section 20e, as described hereinafter.

The liquid crystal panel 42 in the present embodiment is a panel having an XGA-size pixel count provided with 1024 effective pixels in the horizontal direction and 768 effective pixels in the vertical direction, and can display gradations corresponding to the Data in any position by adjusting the content and output timing of the image data Data outputted by the liquid crystal panel driver 41. The configuration in the present embodiment is one in which the image of the subject is displayed on the basis of the image-capture data of the area image sensor 15, doing so in the predetermined subject image display region of the liquid crystal panel 42, whereas characters indicating image-capturing conditions or other information are displayed in a region apart from the subject image display region.

In other words, characters indicating image-capturing conditions or other information are displayed as an OSD (on-screen display) together with the image of the subject in the liquid crystal panel 42. The liquid crystal panel 42 is provided with a large number of pixels in excess of the effective pixels in the horizontal direction and the vertical direction, but in order to simplify the present specification, no description is given of the processing that relates to pixels other than the effective pixels.

The optical system 10 is provided with a lens 11 for forming a subject image on the area image sensor 15, and an aperture 12, a shutter 13, and a low-pass filter 14. Among these components, the lens 11 and the aperture 12 are replaceably attached to a chassis not shown in the drawing. A CMOS (complementary metal oxide semiconductor) image sensor, CCD (charge coupled device) image sensor, or other solid image-capturing element provided with color filters arranged in a Bayer array, and a plurality of photodiodes for accumulating a charge according to a quantity of light by photoelectric conversion for each pixel is used as the area image sensor 15. The positions of the pixels of the area image sensor 15 are prescribed by coordinates in an orthogonal coordinate system, wherein a line is composed of a plurality of pixels aligned in the direction parallel to one coordinate axis, and a plurality of lines is aligned in the direction parallel to the other coordinate axis. In the present specification, the direction parallel to the lines is referred to as the horizontal direction, the direction perpendicular to the lines is referred to as the vertical direction. A single screen composed of all the pixels of the area image sensor 15 is referred to as a single frame.

In the present embodiment, the area image sensor 15 also operates in synchrony with the various types of signals outputted by the timing generator 30. In other words, the timing generator 30 outputs a vertical synchronization signal (SVsync) for prescribing a period for reading the detection results of the photodiodes for a single frame; a horizontal synchronization signal (SHsync) for prescribing a period for reading the detection results of the photodiodes for a single line; and a data clock signal (SDotclock) for prescribing the read timing and the like of image data of each pixel. In accordance with the vertical synchronization signal SVsync, the area image sensor 15 starts to output image-capture data equivalent to one frame; and within a period prescribed by the horizontal synchronization signal SHsync sequentially reads out image-capture data indicating the detection results of photodiodes corresponding to some of the pixels of the area image sensor 15, at a timing in accordance with the data clock signal SDotclock.

The ASIC 200 is provided with an image-data-generation section 20 which is composed of a circuit for performing processing whereby line buffers 52a through 52d for a plurality of lines reserved in advance in the SD-RAM 52 are utilized, and image data for displaying an image of the subject in the display section 40 are generated by pipeline processing. The ASIC 200 may also be an image processing DSP (digital signal processor). The line buffers 52a through 52d for a plurality of lines may also be provided to the image-data-generation section 20 or another component. The display section 40 displays the subject on the liquid crystal panel 42 on the basis of the generated image data. In other words, the user can confirm the subject while utilizing the display section 40 as an EVF.

Also, in the case that the user has operated the operating section 55 to carry out an image capture instruction, in accordance with the image capture instruction the area image sensor 15 starts to output image-capture data equivalent to one frame in accordance with the vertical synchronization signal SVsync; and, within a period prescribed by the horizontal synchronization signal SHsync, sequentially reads out image-capture data indicating the detection results of the photodiodes corresponding to all of the effective pixels of the area image sensor 15, at a timing in accordance with the data clock signal SDotclock. The image-data-generation section 20 then utilizes the SD-RAM 52 or another component to generate image data in a JPEG format or other format, and the image data are recorded in a removable memory or the like not shown in the drawing. In other words, the user can generate image data for indicating the subject.

(2) Control of the Horizontal Synchronization Signal

Figure 2:
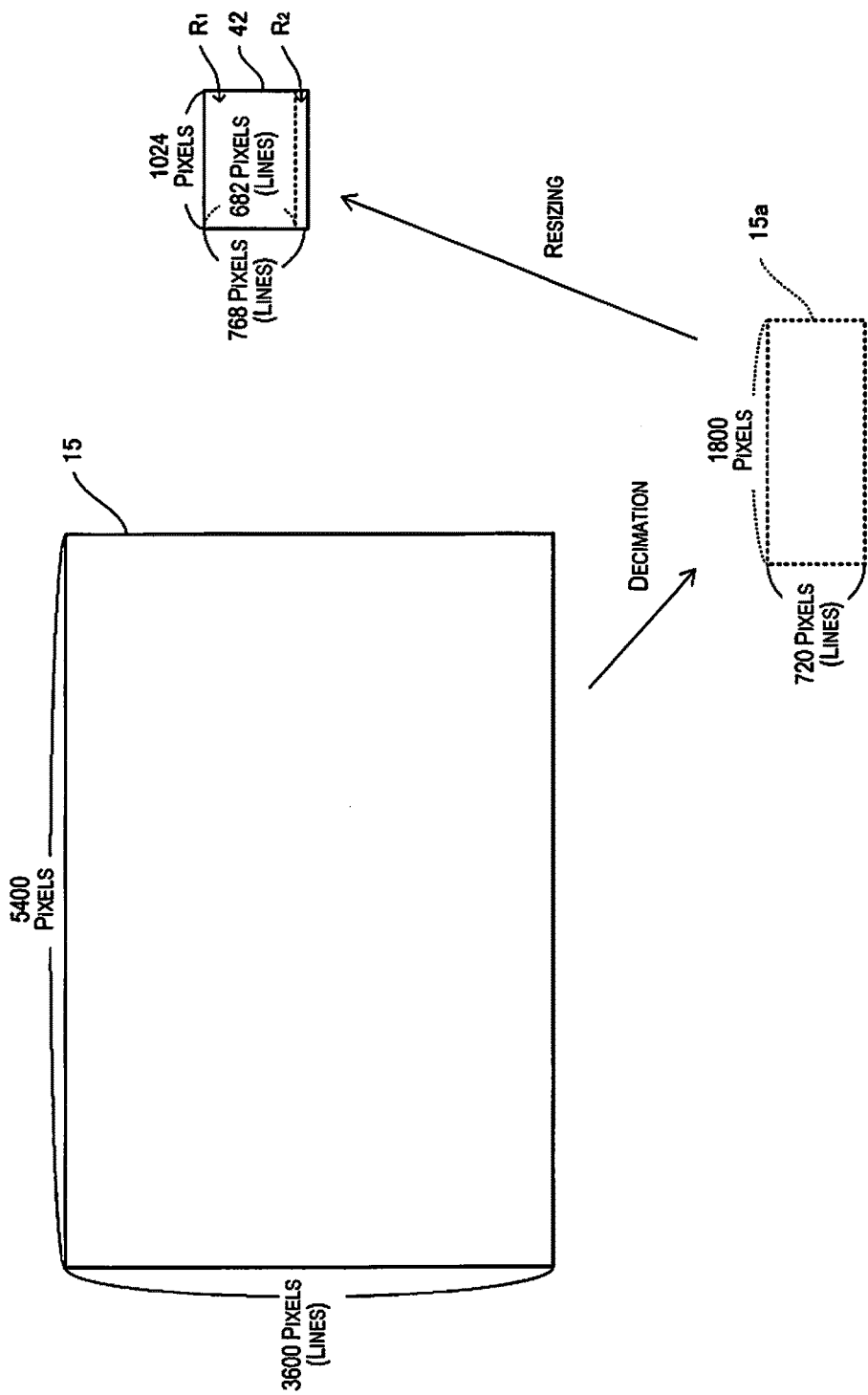
FIG. 2 is a view showing the number of pixels of the area image sensor and the liquid crystal panel.

In a case in which image data indicating a subject are recorded in the removable memory or the like, and printing or another operation is considered, the number of pixels of the area image sensor 15 must be greater than a predetermined number in order to obtain high-quality image data. Therefore, the effective number of pixels of the area image sensor 15 in the present embodiment is 5400 pixels in the horizontal direction and 3600 pixels in the vertical direction, as shown in FIG. 2. The area image sensor 15 is provided with a large number of pixels in excess of the effective pixels in the horizontal direction and the vertical direction, but in order to simplify the present specification, no description is given of the processing that relates to pixels other than the effective pixels.

On the other hand, the liquid crystal panel 42 is provided with 1024 pixels in the horizontal direction and 768 pixels in the vertical direction, as described above, and is configured so that the image of the subject is displayed in the subject image display region (R1 shown in FIG. 2). In the present embodiment, in order to display the image of the subject as large as possible while maintaining the aspect ratio (2:3) of the area image sensor 15, a rectangular region of a 2:3 aspect ratio whose top side and left and right sides contact the top side and left and right sides of the liquid crystal panel 42 is adopted as the subject image display region R1 for displaying the image of the subject. The remaining region is the information display region (region shown in FIG. 2) for displaying characters indicating image-capturing conditions or other information. Consequently, the subject image display region R1 in the liquid crystal panel 42 is composed of 1024 pixels in the horizontal direction and 682 pixels in the vertical direction. As described above, the number of pixels of the area image sensor 15 and the number of pixels of the liquid crystal panel 42 are not the same in the present embodiment.

Furthermore, since the display in the display section 40 is utilized by the user to confirm the subject, when the delay between the timing at which the subject is captured by the area image sensor 15 and the timing at which the image of the captured subject is displayed by the display section 40 is noticeable by the user, the subject seen in the EVF and the recorded image of the subject are misaligned, and the EVF becomes extremely difficult to use. The delay must therefore be minimal when the display section 40 is used as an EVF.

Therefore, in order for the image captured by the area image sensor 15 to be displayed in the display section 40 so that the delay is so extremely short as to not be seen by the human eye, a configuration is adopted in the present embodiment whereby various types of processing are performed by the area image sensor 15 and the image-data-generation section 20, and the display section 40 causes the image data generated as a result of the processing to be displayed at high speed.

In other words, the area image sensor 15 according to the present embodiment is provided with a circuit capable of executing interlaced scanning for reading the detection results of the photodiodes at a ratio of 1 for every n (where n is an odd number) lines aligned in the vertical direction. An adder is also provided for adding m (where m is a natural number) detection results aligned in the horizontal direction among the photodiodes for performing photoelectric conversion via color filters of the same color, and outputting 1/m of the sum (i.e., outputting the arithmetic average of the m detection results). The present embodiment is configured so that when the display section 40 is caused to function as an EVF, interlaced scanning and processing by the adder are executed in the area image sensor 15, whereby pixels in the horizontal direction and the vertical direction are decimated, and the image-capture data of a smaller number of pixels than the number of pixels provided to the area image sensor 15 are outputted, and the subject can thereby be captured at high speed.

Figure 3:
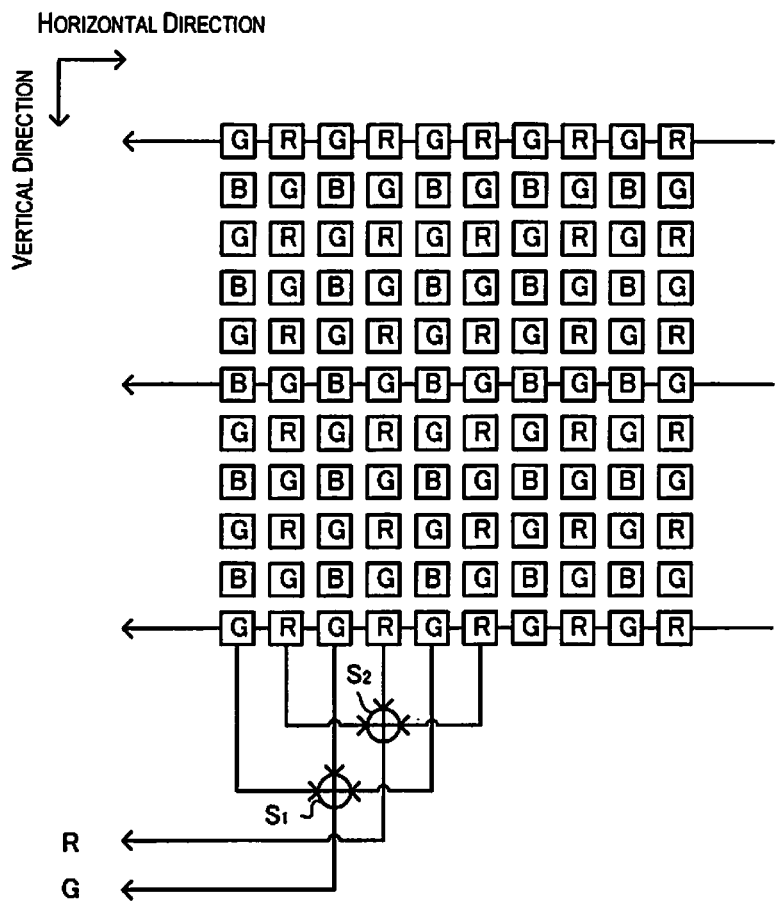
FIG. 3 is a view showing an example of the method for outputting the image-capturing of the area image sensor.

In other words, in a live view mode for causing the display section 40 to function as an EVF, the area image sensor 15 reads for lines in the vertical direction at a ratio of 1 for every n lines in accordance with the horizontal synchronization signal SHsync. Also, the process whereby the result of addition of detection results for m photodiodes by an adder is output as the image-capture data is carried out in accordance with the data clock signal SDotclock. FIG. 3 shows an example of the method for outputting the image-capture data of a smaller number of pixels than the number of pixels provided to the area image sensor 15 in the present embodiment. In FIG. 3, the rectangles labeled R indicate photodiodes that correspond to color filters for transmitting light in a red spectrum, the rectangles labeled G indicate photodiodes that correspond to color filters for transmitting light in a green spectrum, and the rectangles labeled B indicate photodiodes that correspond to color filters for transmitting light in a blue spectrum.

As shown in FIG. 3, in a case in which the color filters of the pixels indicated by rectangles are in a Bayer array, since a color filter of only one color corresponds to each pixel, the color of each pixel must be interpolated by utilizing the surrounding pixels. Therefore, when lines are decimated to acquire the image-capture data, decimation must be performed so that the color filters of adjacent lines after decimation are of a different color. Therefore, in the present embodiment, by acquiring the detection values in the photodiodes of each line at a ratio of 1 line for every n lines (where n is an odd number) as the image-capture data, it is possible to acquire image-capture data in which the color of each pixel can be specified by interpolation. In the present embodiment, a configuration is adopted in which the image-capture data are acquired at a ratio of 1 line for every 5 lines in order to make the number of lines in the vertical direction of the area image sensor 15 as close as possible to the number of lines in the vertical direction of the subject image display region R1 of the liquid crystal panel 42. In FIG. 3, the left-directed arrows indicate that image-capture data are acquired at a ratio of 1 line for every 5 lines, and in this example, the number of lines in the vertical direction is 1/5, i.e., 720.

In a case in which the color filters are in a Bayer array, the colors of adjacent pixels in the horizontal direction are different, and the same color of color filter occurs at every other position. Therefore, decimation processing can essentially be performed by adding m at every other pixel for pixels aligned in the horizontal direction and multiplying the sum by 1/m (i.e., calculating the arithmetic average of m detection results). In the present embodiment, m is set to 3, due to such factors as limitations for the sake of image quality in cases in which adding is performed by the adder. In the configuration shown in FIG. 3, in the lowest line shown, the detection results of the three photodiodes aligned in the horizontal direction that are photodiodes for performing photoelectric conversion via green color filters are added by an adder S1 and multiplied by 1/3, and the detection results of the three photodiodes aligned in the horizontal direction that are photodiodes for performing photoelectric conversion via red color filters are added by an adder S2 and multiplied by 1/3. In this example, the number of pixels in the horizontal direction is 1/3, i.e., 1800 pixels. In FIG. 2, the data size after decimation in the area image sensor 15 is indicated by the dashed-line rectangle 15*a*.

As described above, in the area image sensor 15, the number of lines in the vertical direction may be set to 720, and the number of pixels in the horizontal direction may be set to 1800. However, in such decimation, because of n being an odd number in the vertical direction, m being a natural number in the horizontal direction, and other such limitations for the sake of image quality, the number of pixels after decimation and the number of pixels of the subject image display region R1 of the liquid crystal panel 42 do not readily coincide. In a case in which n and m differ, as described above, the aspect ratio differs between the subject and the subject image on the liquid crystal panel 42.

A configuration is therefore adopted in the present embodiment in which resizing is further performed in the image-data-generation section 20 for the decimated image-capture data, and image data are generated for display in the subject image display region R1 of the liquid crystal panel 42. In other words, the image-data-generation section 20 is provided with a pixel interpolation section 20*a*, a color reproduction processing section 20*b*, a filter processing section 20*c*, a gamma correction section 20*d*, and a resizing processing section 20*e*. In this configuration, the number of pixels in the vertical direction and the horizontal direction is modified by the resizing processing section 20*e* in the processing for generating the image data, and image data are generated which are equivalent to the number of pixels of the subject image display region R1 of the liquid crystal panel 42.

The line buffer 52*a* is a buffer memory for temporarily recording the decimated image-capture data outputted from the area image sensor 15, and when the decimated image-capture data are outputted from the area image sensor 15, the image-capture data are temporarily recorded in the line buffer 52*a* by the processing of the image-data-generation section 20. The pixel interpolation section 20*a* imports data of the necessary number of pixels for generating the colors of the two channels missing in each pixel in the Bayer array from the line buffer 52*a*, and while doing so, generates the colors of the two channels by interpolation processing. As a result, three channels of data are generated in each pixel. The color reproduction processing section 20*b* then performs color conversion processing for color matching by performing a 3×3 matrix computation on the basis of the generated data. The data generated by color conversion processing are temporarily recorded in the line buffer 52*b*. The filter processing section 20*c* then executes sharpness adjustment, noise removal processing, and other processing by filter processing. The gamma correction section 20*d* then executes gamma correction to compensate for a characteristic difference between the colors indicated by the gradation values of the image-capture data of the area image sensor 15 and the colors indicated by the gradation values of the image data handled by the display section 40. The data generated by gamma correction are temporarily recorded in the line buffer 52*c*.

The number of pixels in the data that is recorded line by line in the line buffer 52*c* is one obtained through decimation in the area image sensor 15. In other words, data of 720 lines in the vertical direction and 1800 pixels in the horizontal direction are recorded line by line. The resizing processing section 20*e* performs resizing by sequentially referencing the data recorded in the line buffer 52*c* to perform interpolation computation processing and specify the gradation value of each channel in the positions between pixels. In the present embodiment, since the decimation in the area image sensor 15 described above is 1/5 in the vertical direction and 1/3 in the horizontal direction, the aspect ratio of the decimated data differs from the aspect ratio of the image-capture data of the area image sensor 15, as shown in the rectangle 15a in FIG. 2. Therefore, the resizing processing section 20e first performs reduction processing for reduction to a size of approximately 57% in the horizontal direction on the basis of the data recorded in the line buffer 52c. As a result, the number of pixels in the horizontal direction is set to 1024. The resizing processing section 20e also performs reduction processing for reduction to a size of approximately 95% in the vertical direction. As a result, image data are generated for which there are 1024 pixels in the horizontal direction and 682 lines in the vertical direction. The generated image data are recorded line by line in the line buffer 52d.

In the present embodiment, by the processing described above, generation processing is performed for generating image data that can be displayed in the subject image display region R1 of the liquid crystal panel 42 on the basis of the image-capture data of the area image sensor 15, but the image-capture data of the area image sensor 15 have 720 lines in the vertical direction, whereas the number of lines of the image data in the vertical direction is 682, and the number of lines of the liquid crystal panel 42 in the vertical direction is 768. In other words, different numbers of lines are required to capture a single frame and to display a single frame.

Therefore, in the present embodiment, the horizontal synchronization signal SHsync, the vertical synchronization signal SVsync, the data active signal SDactive, and the data clock signal SDotclock of the area image sensor 15 are set to the cycle necessary for driving the area image sensor 15. In other words, the timing generator 30 outputs the horizontal synchronization signal SHsync the number of times and at the timing whereby the decimation in the vertical direction such as described above can be performed in the area image sensor 15, and the image-capture data of the number of lines of a single frame can be acquired within the period prescribed by the vertical synchronization signal SVsync. The timing generator 30 also outputs the data clock signal SDotclock the number of times and at the timing whereby decimation in the horizontal direction such as described above can be performed, and the image-capture data of the number of pixels of a single line can be acquired within the period prescribed by the horizontal synchronization signal SHsync.

On the other hand, in order to minimize the delay period and perform display in the liquid crystal panel 42 on the basis of the image-capturing data outputted line by line from the area image sensor 15, a configuration is adopted in the present embodiment whereby the horizontal synchronization signal DHsync is outputted at the time that the image data for display of each line of the liquid crystal panel 42 are prepared. In other words, the liquid crystal panel 42 in the present embodiment is capable of displaying lines for which processing by the resizing processing section 20e is ended. The timing generator 30 therefore outputs the horizontal synchronization signal DHsync for displaying the Nth line in the vertical direction of the liquid crystal panel 42 at the time that the processing for generating the image data of the Nth line (where N is a natural number) is ended.

Specifically, the timing generator 30 is provided with a progress-information-acquiring section 30a, and the progress-information-acquiring section 30a is capable of acquiring, from the resizing processing section 20e, progress information for indicating a line for which the processing for generating image data is ended in the resizing processing section 20e. Consequently, through this progress information, it is possible to specify a line that can be displayed in the liquid crystal panel 42 on the basis of the image data. Therefore, in this configuration, the timing generator 30 outputs the horizontal synchronization signal DHsync in synchrony with the timing at which the processing for generating the image data of each line is ended, and display of a line for which the processing for generating the image data is thereby started in the liquid crystal panel 42. Through this configuration, display of each line does not start before preparation of the image data is finished, and each line can be immediately displayed with the display preparation thereof is finished.

Since the liquid crystal panel 42 is preferably capable of displaying the pixels of each line of the liquid crystal panel 42 within the horizontal synchronization period prescribed by the output timing of the horizontal synchronization signal DHsync, the timing generator 30 outputs the data active signal DDactive and the data clock signal DDotclock so that the pixels of a single line can be displayed within a period assumed to be the period in which the horizontal synchronization period prescribed by the output timing of the horizontal synchronization signal DHsync is shortest.

In the present embodiment, the vertical synchronization signal SVsync of the area image sensor 15 and the vertical synchronization signal DVsync of the liquid crystal panel 42 are set so as to be synchronized in order to prevent the image-capture data from the area image sensor 15 and the display by the liquid crystal panel 42 from becoming inconsistent by frame units. In other words, the timing generator 30 outputs the vertical synchronization signal DVsync of the display section 40 after a predetermined period from the timing at which the vertical synchronization signal SVsync of the area image sensor 15 is outputted. As a result, the cycles of the vertical synchronization signals SVsync, DVsync are the same and constant in the present embodiment. Consequently, the display in the liquid crystal panel 42 of the subject captured by the area image sensor 15 is not delayed by the period of a single frame or longer, and a display of an image of the subject captured at the same timing does not remain on the liquid crystal panel 42 for a period of a plurality of frames.

Since the horizontal synchronization period prescribed by the horizontal synchronization signal DHsync of the liquid crystal panel 42 is of variable length in the present embodiment, the cycles of the vertical synchronization signals SVsync, DVsync are the same and constant even when the horizontal synchronization period varies. Specifically, the timing generator 30 controls the output signal so that the vertical synchronization period for displaying a single frame is constant by lengthening or shortening the horizontal synchronization period with respect to a reference period TH determined in advance, and thereby canceling out the time fluctuation from a reference period TH. The reference period TH is configured as the horizontal synchronization period in a case in which each of the total number of lines of the liquid crystal panel 42 is displayed for an equal period within the vertical synchronization period.

In the subject image display region R1, a state is attained in which the horizontal synchronization period can be lengthened by waiting to output the horizontal synchronization signal DHsync until the processing for generating the image data of each line is ended. In the information display region R2 of the liquid crystal panel 42 for displaying characters indicating image-capturing conditions or other information, the horizontal synchronization period is made shorter than the reference period TH so as to cancel out the cumulative total of the difference of the horizontal synchronization period lengthened in the subject image display region R1 and the reference period TH.

Figure 4:
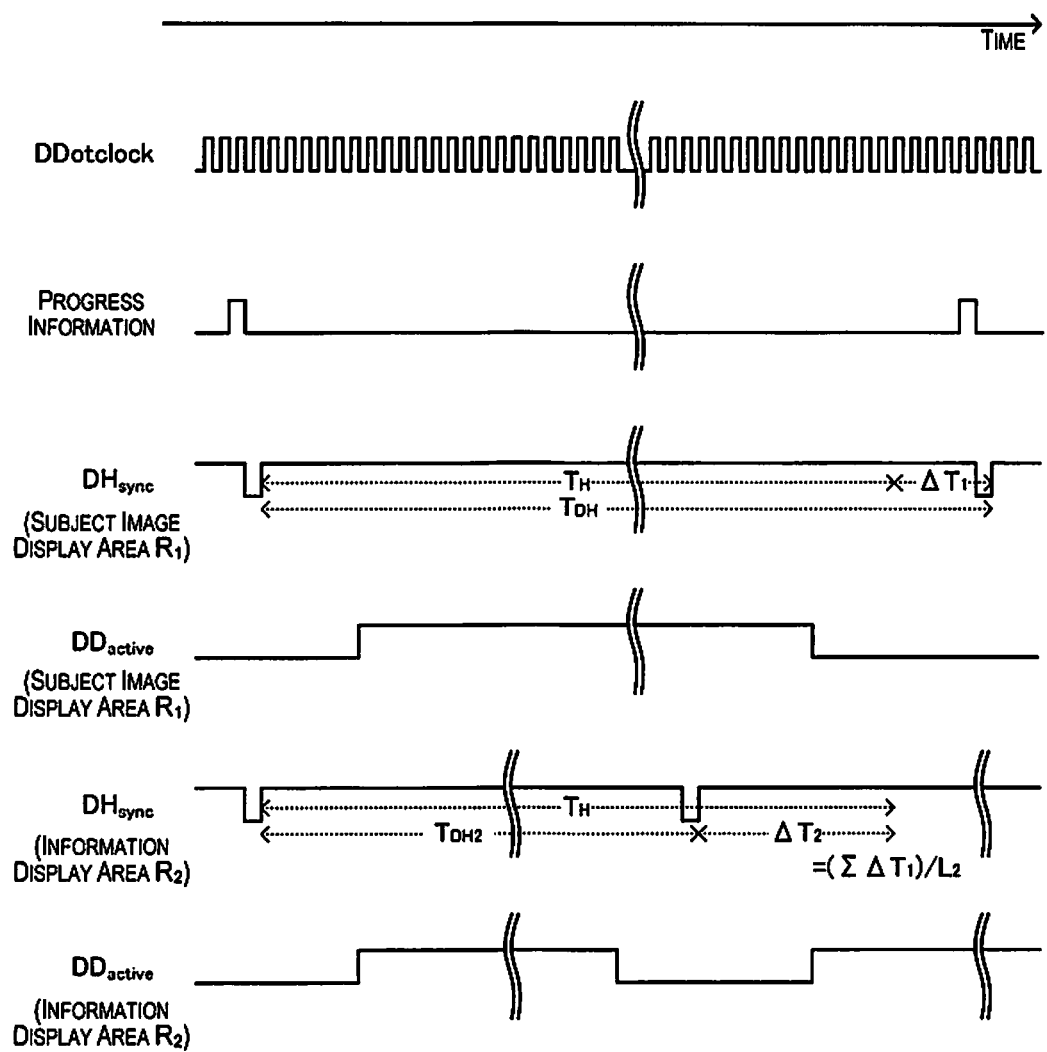
FIG. 4 is a timing chart showing the signals applied to the display section according to the present embodiment.

FIG. 4 shows the horizontal synchronization signal DHsync outputted from the timing generator 30 configured as described above, and also shows the data active signal DDactive, the data clock signal DDotclock, and the progress information. The progress information outputted from the resizing processing section 20e in the present embodiment is composed of a single pulse in which a low-level output is maintained as the processing for generating the image data for a single line is being executed, and a high-level output occurs at a predetermined period at the time that the processing for generating the image data for a single line is ended.

When the timing generator 30 acquires the progress information through the progress-information-acquiring section 30a, the horizontal synchronization signal DHsync is outputted in synchrony with the pulse of the progress information by the processing of the display control section 30b. Therefore, even in a case in which the processing for generating the image data of a certain line fails to occur within the reference period TH, the horizontal synchronization signal DHsync is not outputted until the generation processing is ended, and a horizontal synchronization period TDH becomes longer than the reference period TH. Consequently, in a case in which the processing for generating the image data of a certain line fails to occur within the reference period TH, display of the certain line is not started in the liquid crystal panel 42 until the generation processing is completed. Display is also not performed before preparation of the image data of each line is ended. Furthermore, since the horizontal synchronization signal DHsync is outputted when the processing for generating the image data of a certain line is ended, the image data of each line is displayed without delay when preparation thereof is ended. As described above, since the liquid crystal panel 42 in the present embodiment is driven in a state in which the horizontal synchronization period TDH may be longer than the reference period TH, the invention is suitable for application to a situation in which the period for generating the image data of a single line to be displayed by the liquid crystal panel 42 may fluctuate. A possible example of such a situation is one in which the speed of data output processing of the area image sensor 15 or the processing for generating image data by the image-data-generation section 20 may differ for each line.

The invention may also, of course, be applied in a situation in which the processing speed differs for each line depending on the image-capturing conditions or the hardware used for capturing and image. For example, the invention can be applied to a configuration in which the vertical synchronization period or the horizontal synchronization period of the area image sensor 15 fluctuates, or the period needed for processing for generating image data fluctuates due to an operation of the operating section 55 by the user. The invention can also be applied to a configuration in which the vertical synchronization period or the horizontal synchronization period of the area image sensor 15 fluctuates, or the period needed for processing for generating image data fluctuates due to the changing of an interchangeable EVF or an interchangeable lens.

As described above, in the subject image display region R1 in the present embodiment, the timing generator 30 adjusts the horizontal synchronization period TDH in accordance with the progress information outputted from the resizing processing section 20e. The horizontal synchronization signal DHsync may therefore be lengthened according to the progress of the processing for generating the image data to be displayed in the subject image display region R1, and the horizontal synchronization period TDH prescribed by the horizontal synchronization signal DHsync of the liquid crystal panel 42 is not necessarily constant. On the other hand, since the vertical synchronization period prescribed by the vertical synchronization signal DVsync is constant in the present embodiment, as described above, the timing generator 30 sets the output timing of the horizontal synchronization signal DHsync so that a horizontal synchronization period TDH2 is shorter than the abovementioned reference period TH in the information display region R2, so that displaying of all the lines of the liquid crystal panel 42 ends within the vertical synchronization period even in a case in which the horizontal synchronization period TDH in the subject image display region R1 is lengthened.

In other words, since the data (referred to as OSD data) of the characters indicating the image-capturing conditions or other information can be created in advance and recorded in advance in the VRAM 51 irrespective of operation of the area image sensor 15, an appropriate display can be performed without overtaking the reading of data even when a display based on the OSD data is executed according to a short horizontal synchronization period. Therefore, in the present embodiment, the horizontal synchronization period in the information display region R2 for displaying characters indicating image-capturing conditions or other information is set so as to be shorter than that of the subject image display region R1 for producing a display based on the image-capture data of the area image sensor 15.

Specifically, the timing generator 30 adjusts the output timing of the horizontal synchronization signal DHsync, and thereby shortens the horizontal synchronization period TDH2 so that the sum of the differences of the lengthened horizontal synchronization period TDH and the reference period TH in the subject image display region R1, and the sum of the differences of the shortened horizontal synchronization period TDH2 and the reference period TH in the information display region R2 coincide. As a result, the following relation obtains: horizontal synchronization period TDH2<reference period≤horizontal synchronization period TDH. Various configurations can be adopted in the information display region R2 as configurations whereby the horizontal synchronization signal DHsync is outputted so that the horizontal synchronization period TDH2 is shorter than the reference period TH. For example, as shown in FIG. 4, a configuration may be adopted in which the period of shortening in each line is equal to a value T2 obtained by dividing the sum of delay T1 (ΣT1) with respect to the horizontal synchronization period TH generated in the subject image display region R1 by the number of lines L2 of the information display region R2. In other words, a configuration may be adopted in which the value of horizontal synchronization period TH−ΔT2 is assumed to be the horizontal synchronization period TDH2 in the information display region R2.

As described above, in order to produce a suitable display in each region on the basis of the horizontal synchronization signal adjusted for each region of the liquid crystal panel 42 in the present embodiment, the line numbers of the portions of the liquid crystal panel 42 that correspond to the subject image display region R1 and the information display region R2 are determined in advance. For example, in the example shown in FIG. 2, lines 1 through 682 are the subject image display region R1, and lines 683 through 768 are the information display region R2. Therefore, the timing generator 30 outputs the horizontal synchronization signal DHsync so that the horizontal synchronization period TDH2 is shorter than the abovementioned reference period TH during display in the information display region R2 that corresponds to lines 683 through 768, while the timing generator 30 outputs the horizontal synchronization signal DHsync at a timing in accordance with the abovementioned progress information during display in the subject image display region R1 that corresponds to lines 1 through 682.

The ASIC 200 is also provided with an image data output section 201, and the image data output section 201 outputs the image data (Data) recorded in the line buffer 52$d$ to the display section 40 line by line during display of lines 1 through 682 of the liquid crystal panel 42. As a result, the image of the subject captured by the area image sensor 15 is displayed in the subject image display region R1.

The CPU 50 records OSD data to the VRAM 51 prior to at least display in an information display region R2. During display in lines 683 through 768 of the liquid crystal panel 42, the image data output section 201 outputs the OSD data recorded in the VRAM 51 to the display section 40 line by line as the image data (Data). As a result, characters indicating image-capturing conditions and the like are displayed in the information display region R2.

Through this configuration, display of image-capturing conditions or other information by the OSD data is performed within a short horizontal synchronization period in the information display region R2, while the subject captured by the area image sensor 15 is displayed in the subject image display region R1 in a state of minimal delay. Then, in the manner described above, the horizontal synchronization periods are controlled such that the sum of differences between the reference period TH and the lengthened horizontal synchronization period TDH in the subject image display region R1 and the sum of differences between the reference period TH and the shortened horizontal synchronization period TDH2 in the information display region R2 coincide, whereby display by the display section 40 can take place under conditions in which the cycles of the vertical synchronization signals SVsync, DVsync are the same and constant. Consequently, the display in the liquid crystal panel 42 of the subject captured by the area image sensor 15 is not delayed by the period of a single frame or longer, and the same image does not remain displayed on the liquid crystal panel 42 for a plurality of frame periods.

(3) Control of Signals Applied to the Area Image Sensor

In the present embodiment, furthermore, the output timing of the vertical synchronization signal SVsync is variable in accordance with conditions of progress of processing by the image data processing section 20. For this purpose, the timing generator 30 is provided with a sensor control section 30$c$ (corresponding to the image-capture control section). The sensor control section 30$c$ outputs the vertical synchronization signal SVsync at a point in time when preparations have been made for carrying out processing to generate image data of the frame (next frame) that follows the frame (current frame) which is being processed to generate the current image data. As mentioned above, in the case that the time needed for processing to generate image data differs for individual lines, the time needed for processing to generate image data corresponding to the equivalent of one frame may differ as well. FIG. 5A shows an example thereof. Let the reference cycle of the vertical synchronization signal SVsync be denoted as TSV0. The example of FIG. 5A depicts a situation in which, at a timing coincident with output of the vertical synchronization signal corresponding to the n+1-th frame (the timing of the reference cycle TSV0), the image data generation process for the n-th frame has ended, and preparations are in order for carrying out the image data generation process for the n+1-th frame. The progress information shown in FIG. 5A is a signal identical to the progress information described using FIG. 4.

The n+1-th frame of FIG. 5A shows an example in which, at a timing coincident with the elapsing of the reference cycle TSV0 following output of the vertical synchronization signal SVsync corresponding to the n+1-th frame, preparations are not in order for starting processing to generate image data of the n+2-th frame. In other words, at timing coincident with elapse of the reference cycle TSV0, processing to generate image data corresponding to the n+1-th frame up through the last line thereof has not yet ended. The description continues on the assumption that, in the present embodiment, there has arisen a condition whereby, after generation of image data corresponding to the last line of the current frame has ended and the image data has been output to the display section 40 by the image data output section 201, preparations are not in order in the image-data-generation section 20 for acquiring the image-capture data corresponding to the next frame and for starting processing to generate the image data of the next frame. At timing coincident with an elapsing of the reference cycle TSV0 following output of the vertical synchronization signal SVsync corresponding to the n+1-th frame of FIG. 5A, if the processing to generate image data corresponding to the last line of the n+1-th frame has not yet ended when the vertical synchronization signal SVsync is output at the timing in question, the image-capture data corresponding to the next frame will be acquired from the area image sensor 15 under conditions in which preparations for starting processing to generate image data corresponding to the next frame are still not in order in the image-data-generation section 20.

In order to prevent this, at a timing coincident with the elapsing of the reference cycle TSV0, the sensor control section 30$c$ decides whether or not a period that extends from the start of processing to generate image data corresponding to one frame, up to a condition in which preparations are in order for starting of processing to generate image data corresponding to the next frame, should be lengthened to longer than the reference cycle TSV0; and in the case of an extension, waits to output the vertical synchronization signal SVsync of the next frame until preparations for carrying out processing to generate image data corresponding to the next frame are in order in the image-data-generation section 20. Then, after preparations are in order in the image-data-generation section 20, the sensor control section 30$c$ outputs the vertical synchronization signal SVsync to the area image sensor 15.

The reference cycle TSD0 of the dot clock SDotclock which is output to the area image sensor 15 is determined in advance by the specifications of the area image sensor 15. Likewise, the reference pulse count PSD0 of the dot clock SDotclock which is output to the area image sensor 15 during the period of one cycle of the horizontal synchronization signal SHsync is also determined in advance as a specification of the area image sensor 15. The reference pulse count PSH0 of the horizontal synchronization signal SHsync which is output to the area image sensor 15 during the period of one cycle of the vertical synchronization signal SVsync is determined as well. Similarly, the reference cycle TSV0 of the vertical synchronization signal SVsync is determined in advance by specifications.

In the present embodiment, for the purpose of determining whether or not a period longer than the reference cycle TSV0 will be needed to put preparations in order for processing to generate image data corresponding to the next frame, the number of lines for which processing to generate image data has been completed is identified from the progress information of the line units output from the resizing processing section 20c. If, within the period of the reference cycle TSV0, processing to generate image data has been completed up through the last line, the vertical synchronization signal SVsync for the purpose of acquiring the image-capture data of the next frame is output at the timing of the reference cycle TSV0 (the n+1-th vertical synchronization signal of FIG. 5A). If, at timing coincident with the elapsing of the period of the reference cycle TSV0, processing to generate image data up through the last line has not yet ended, the sensor control section 30c outputs the vertical synchronization signal SVsync (the n+2-th vertical synchronization signal of FIG. 5A) only after it has been verified, on the basis of progress information, that processing to generate image data corresponding to the last line has ended. In other words, the sensor control section 30c prolongs the actual cycle TSV of the vertical synchronization signal SVsync for a period of time longer than the reference cycle TSV0.

Specifically, in the case that, at timing coincident with the elapsing of the reference cycle TSV0, processing to generate the image data up through the last line has not ended, the sensor control section 30c continues to output a dummy horizontal synchronization signal SHsync as shown in FIG. 5A, until it is verified on the basis of the progress information that processing to generate the image data corresponding to the last line has ended. In other words, the horizontal synchronization signal SHsync is output in excess of the reference pulse count PSH0 which is output in the reference cycle TSV0, and the period until output of the next vertical synchronization signal SVsync (cycle TSV) is prolonged for a period of time longer than the reference cycle TSV0. The circuit configuration in the present embodiment is such that, despite the dummy horizontal synchronization signal SHsync being output in excess of the reference pulse count PSH0, no vertical synchronization signal is output for an interval which lasts until a pulse of progress information indicating that the processing to generate image data of the last line has ended. The area image sensor 15 ignores the dummy horizontal synchronization signal SHsync, and dummy image-capture data is not generated in response to the signal in question. In the case of the example shown in FIG. 5A, the cycle TSD of the dot clock SDotclock remains at the reference cycle TSD0, and the cycle TSH of the horizontal synchronization signal SHsync remains at the reference cycle TSH0.

As another method for prolonging the vertical synchronization signal SVsync, as shown in FIG. 5B, the sensor control section 30c may increase the pulse count PSD of the dot clock SDotclock during the period of one cycle of the horizontal synchronization signal SHsync to one greater than the reference pulse count PSD0, and thereby prolong the cycle TSH of the horizontal synchronization signal SHsync for a duration longer than the reference cycle TSH0. As a result, the period until output of the next vertical synchronization signal SVsync (cycle TSV) may be prolonged for a period of time longer than the reference cycle TSV0. The area image sensor 15 ignores the dummy dot clock SDotclock, and dummy image-capture data is not generated in response to the signal in question. Also, in a case where the cycle TSH of the horizontal synchronization signal SHsync is prolonged for a period of time longer than the reference cycle TSH0 by increasing the pulse count PSD of the dot clock SDotclock during the period of one cycle of the horizontal synchronization signal SHsync to one greater than the reference pulse count PSD0, while it is preferable for the pulse count of the horizontal synchronization signal SHsync generated in the period of one cycle of the vertical synchronization signal SVsync to be constant, the pulse count of the horizontal synchronization signal SHsync generated in the period of one cycle of the vertical synchronization signal SVsync may be variable as well. At this time, the cycle TSD of the dot clock SDotclock remains at the reference cycle TSD0.

Alternatively, as shown in FIG. 5C, without reducing the pulse count PSD of the dot clock SDotclock during the period of one cycle of the horizontal synchronization signal SHsync, the sensor control section 30c may prolong the cycle TSH of the horizontal synchronization signal SHsync for a period of time longer than the reference cycle TSH0 by prolonging the cycle TSD of the dot clock SDotclock for a period of time longer than the reference cycle TSD0. As a result, the period until output of the next vertical synchronization signal SVsync (cycle TSV) may be prolonged for a period of time longer than the reference cycle TSV0. In this case, the pulse count PSH of the horizontal synchronization signal SHsync per one cycle of the vertical synchronization signal SVsync is not reduced to one smaller than the reference pulse count PSH0.

As described above, in the present embodiment, acquisition of image-capture data from the area image sensor 15 can start under conditions in which preparations are in order for starting processing to generate the image data of the next frame. As a result, it is possible to prevent overwriting or destruction of lines for which processing to generate the image data is not yet complete by the image-capture data.

(4) Other Embodiments

The embodiment described above is merely one example of how the invention is implemented, it being possible to adopt various other embodiments, such as combinations of the following modified examples, without departing from the spirit of the invention.

For example, a back porch of the horizontal synchronization signal DHsync may be lengthened when the horizontal synchronization period TDH is made longer than the reference period TH. In this configuration, the output period of progress information from the resizing processing section 20e is detected in the progress-information-acquiring section 30a in the configuration shown in FIG. 1. In other words, the period TS(N−1) is detected between the progress information outputted at the time that processing for generating the image data of the (N−1)th line is ended and the progress information outputted at the time that processing for generating the image data of the Nth line is ended. The timing generator 30 then determines the length of the back porch of the horizontal synchronization signal DHsync of the Nth line on the basis of the period TS(N−1), and outputs various types of signals.

Figure 6:
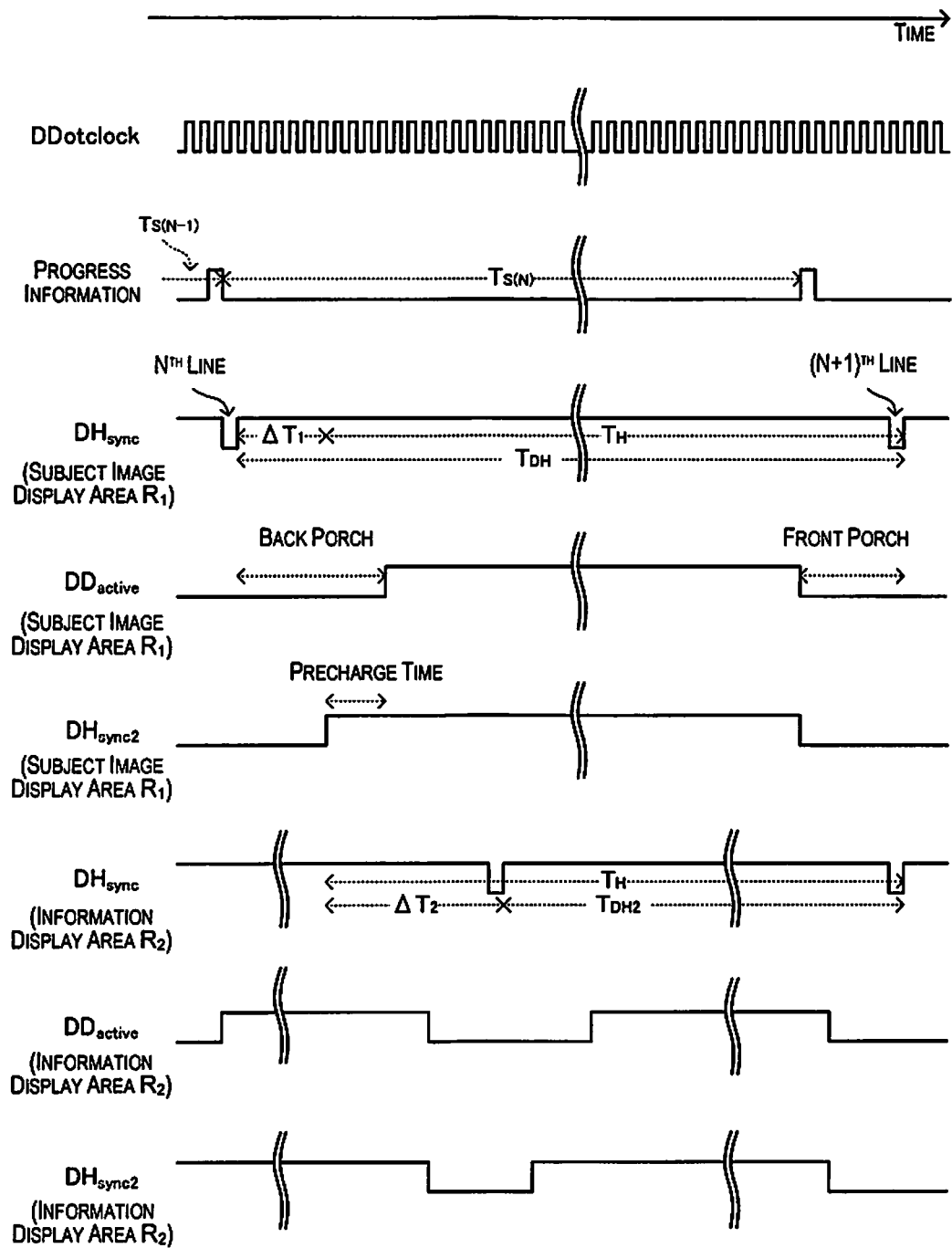
FIG. 6 is a timing chart according to another embodiment of the invention.

In other words, by the processing of the display control section 30b, the timing generator 30 outputs a signal DHsync2 indicating a precharge period when a period ΔT1 has elapsed after outputting of the horizontal synchronization signal DHsync of the Nth line, as shown in FIG. 6, the period ΔT1 being obtained by subtracting the length of the reference period TH from the length of the period TS(N−1). By the processing of the display control section 300b, the timing generator 30 then outputs DDactive when the predetermined precharge period has elapsed after outputting of the signal DHsync2, and outputs the horizontal synchronization signal DHsync of the (N+1)th line, providing a front porch having a predetermined period after maintaining the level of DDactive until the data clock signal DDotclock of the number of pixels of a single line is outputted. The period from the start of the precharge period until the end of the front porch coincides with the reference period TH. Consequently, the horizontal synchronization period TDH, which is the period between the horizontal synchronization signal DHsync of the Nth line and the horizontal synchronization signal DHsync of the (N+1)th line, is the sum of the reference period TH and ΔT1. As a result, N lines can be displayed with precharging, inversion, and other operations synchronized with the signal DHsync2 in the liquid crystal panel 42, and the horizontal synchronization period TDH can be made longer than the reference period TH.

In the first embodiment described above, since the front porch of the horizontal synchronization signal DHsync is lengthened, the back porch period can be set as a constant period, and the period for performing precharging, inversion, and other operations can be provided according to normal specifications.

In the embodiment described above, the horizontal synchronization signal SHsync is outputted so that the horizontal synchronization period is shorter in the information display region R2 of the liquid crystal panel 42 than in the subject image display region R1, in order to cause the cycle of the vertical synchronization signal SVsync of the area image sensor 15 and the cycle of the vertical synchronization signal DVsync of the liquid crystal panel 42 to coincide, but the cycle of the vertical synchronization signal SVsync and the cycle of the vertical synchronization signal DVsync of the liquid crystal panel 42 can be made to coincide by another method. For example, since the area image sensor 15 has a larger number of lines than the liquid crystal panel 42 in a normal image-capturing device, in a case in which the horizontal synchronization period that should be maintained within a specific vertical synchronization period is assumed to be equal, the cycle of the horizontal synchronization signal DHsync of the liquid crystal panel 42 is shorter than the cycle of the horizontal synchronization signal SHsync of the area image sensor 15. Consequently, even in a case in which the horizontal synchronization signal DHsync of the liquid crystal panel 42 is lengthened, it is not often necessary to lengthen the vertical synchronization period of the liquid crystal panel 42 according to the lengthening of the horizontal synchronization signal DHsync. In a case in which lengthening the horizontal synchronization signal DHsync causes the vertical synchronization signal DVsync of the liquid crystal panel 42 to be longer than the vertical synchronization signal SVsync of the area image sensor 15, the vertical synchronization signal SVsync of the area image sensor 15 may be lengthened, and the vertical synchronization signal DVsync and vertical synchronization signal SVsync may be synchronized.

In the embodiment described above, a configuration is adopted in which progress information is acquired which indicates for each line whether the resizing processing of the processing for generating image data is ended, but any configuration may be adopted insofar as progress information for the processing of the final step is acquired, even in a case in which the final step of the processing for generating the image data is not the resizing processing. A configuration may also be adopted in which the progress information is acquired for processing of a step prior to the final step (e.g., a step in which the processing time may fluctuate), insofar as processing can be performed at such a high speed that the processing time of the final step of processing for generating the image data can be ignored, processing can be performed in a certain time, or it is possible to predict the ending of the final step. In a case in which an image processing step is included for referencing the data of a plurality of lines and generating data of a single line in the processing for generating the image data, the progress information may be acquired for the included step. That is, it is unnecessary for the processing used to generate the image data to have already been completed at the point in time that the progress information is acquired, and it may be predicted whether or not processing for generating the image data will be completed at the timing of completion of processing for generating the image data based on the acquired progress information, or at a prescribed timing.

Figure 7:
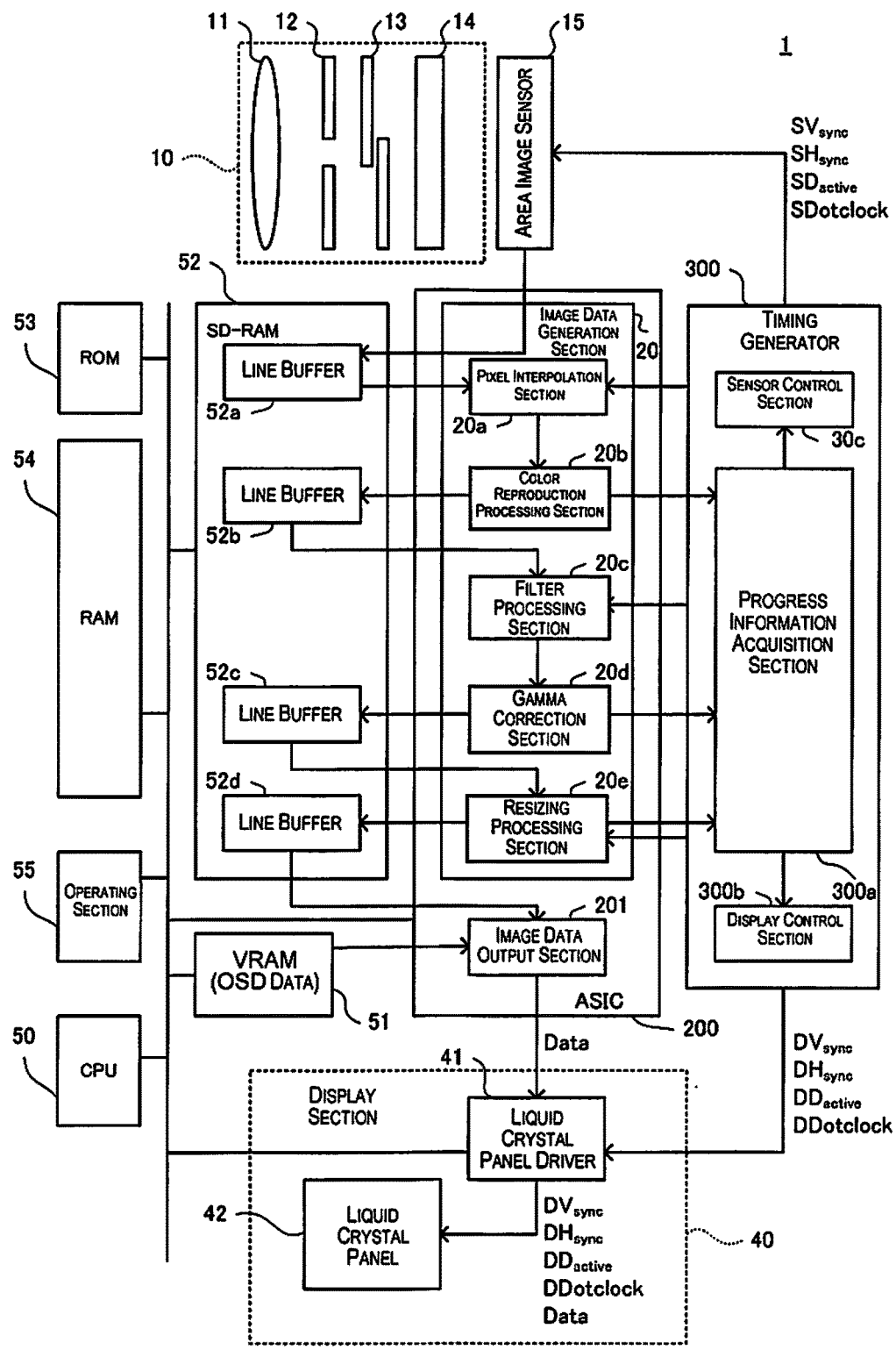
FIG. 7 is a block diagram according to another embodiment of the invention.

FIG. 7 is a view indicating an image-capturing device 1 that is configured so as to acquire progress information for a plurality of image processing steps for referencing the data of a plurality of lines to generate data of a single line. In FIG. 7, the same reference symbols as those of FIG. 1 are used to refer to constituent elements that are the same as those in FIG. 1. A timing generator 300 of the image-capturing device 1 shown in FIG. 7 is capable of acquiring progress information which indicates a line for which outputting of the image-capture data from the area image sensor 15 is completed, and a line for which the processing for generating data in each of the color reproduction processing section 20b, the gamma correction section 20d, and the resizing processing section 20e of the image-data-generation section 20 is ended. By the processing of a display control section 300b, the timing generator 300 is capable of outputting a trigger signal (e.g., a horizontal synchronization signal) for starting processing for generating data of a single line to each of the pixel interpolation section 20a, the filter processing section 20c, and the resizing processing section 20e.

In other words, in the embodiment shown in FIG. 7, processing of data of an Lth line can be executed in the pixel interpolation section 20a when the image-capture data of a Kth line is outputted from the area image sensor 15, and as a result of line-by-line processing by the pixel interpolation section 20a and the color reproduction processing section 20b, specification is made in advance that the processing of data of an Mth line in the filter processing section 20c can be executed when processing of the data of the Lth line is ended. As a result of line-by-line processing by the filter processing section 20c and the gamma correction section 20d, specification is also made in advance that the processing for generating image data of an Nth line can be started in the resizing processing section 20e when processing of the data of the Mth line is ended.

The timing generator 300 specifies that image-capture data of the Kth line is outputted from the area image sensor 15 on the basis of a horizontal synchronization signal SHsync having a prescribed cycle outputted by the timing generator 300. In a case in which specification is made that the image-capture data of the Kth line is outputted from the area image sensor 15, the timing generator 300 outputs the trigger signal to the pixel interpolation section 20a to start data processing of the Lth line. In a case in which a progress-information-acquiring section 300a specifies that processing of the data of the Lth line is ended in the color reproduction processing section 20b, the timing generator 300 outputs the trigger signal to the filter processing section 20c to start data processing of the Mth line. In a case in which the progress-information-acquiring section 300a specifies that processing of the data of the Mth line is ended in the gamma correction section 20d, the timing generator 300 outputs the trigger signal to the resizing processing section 20e to start processing for generating the image data of the Nth line.

When specification is made that processing for generating the image data of the Nth line by the resizing processing section 20e is ended, the timing generator 300 outputs the horizontal synchronization signal DHsync for displaying the Nth line, in the same manner as in the embodiment described above. In other words, in the image-data-generation section 20, in an image processing step in which it is possible to start generating data of a line which is subsequent to recording of the data of two or more lines in a line buffer, a determination is made as to whether processing for generating data of the lowest necessary number of lines is ended, and the next image processing step is started at the time that the generation processing is ended. Through this configuration, processing for each line does not start before preparation of the necessary data for executing each step is finished, and processing for each line can be immediately started when the data of each line are prepared. As a result, the wait time during execution of each image processing step is minimized. In the present embodiment, since the data of only the lowest necessary number of lines is temporarily recorded in the line buffers 52a through 52d, the capacity of the line buffers 52a through 52d can be minimized.

Furthermore, the display section 40 is an EVF which uses a liquid crystal panel in the embodiment described above, but the display section 40 may be a display section other than an EVF. For example, the display section 40 may be a display section which uses a liquid crystal panel attached to a back surface of the image-capturing device 1, or a display section other than a liquid crystal panel may be used. The image-capturing device 1 may also be a single-lens reflex camera provided with a mirror, the image-capturing device 1 may be a movie camera, or the image-capturing device 1 may be a mobile telephone or other device provided with image-capturing functionality. The color filters are also in a Bayer array in the area image sensor 15 described above, but the invention may also be applied in an image-capturing device which utilizes a sensor configured in an arrangement other than a Bayer array. The line buffer 52d may be a line buffer, but may also be a VRAM provided with a recording capacity for recording the image data of a single frame. Through this configuration, various types of processing can be performed on the basis of the image data to be displayed. The horizontal synchronization period is also preferably lengthened with respect to a reference period, and various types of periods can be assumed as the reference period. For example, the cycle of the horizontal synchronization signal SHsync of the area image sensor 15, the cycle for generating the image data, and other cycles may be used as the reference period. Furthermore, various forms may be adopted as the form in which various types of signals are transmitted from the timing generator 30 to the display section 40, and signals may be transmitted by HDMI (high-definition multimedia interface) and other methods. The directions in the embodiment described above may also be reversed. In the horizontal direction, for example, display may be performed from left to right or from right to left.

Also, in relation to the configuration for variable timing of outputting the vertical synchronization signal SVsync on the basis of progress information, in the embodiment above, there was described a configuration whereby preparations are put in order for starting processing for generating image data of the next frame once processing for generating the image data up through the last line of the current frame has ended. As another embodiment, there may be adopted a configuration whereby preparations are put in order for starting processing for generating image data of the next frame once processing has ended for generating the image data up through an L-th line (where L is less than the last line) of the current frame within the period of the reference cycle TSV0. The Lth line may be determined in advance in accordance with the buffer that stores the image-capture data from the area image sensor, the buffers that store data derived from the image-capture data in question by various types of image processing, and the like.

In the embodiment described above, there was described an example in which the horizontal synchronization signal SHsync is output in excess of the reference pulse count PSH0 which is output in the reference cycle TSV0, and the period until output of the next vertical synchronization signal SVsync (cycle TSV) is prolonged for a period of time longer than the reference cycle TSV0. In a case where, for example, the reference pulse count PSH0 is set so as to include a margin (i.e., to the pulse count required for the equivalent of a line, plus a margin), and it is desired to accelerate the timing for generating the vertical synchronization signal SVsync, the vertical synchronization signal SVsync may be generated at the point in time of generation of a horizontal synchronization signal SHsync having a pulse count smaller than the reference pulse count PSH0. Also, in a case where, for example, the reference pulse count PSD0 of the dot clock SDotclock is similarly set so as to include a margin, and it is desired to accelerate the timing for generating the vertical synchronization signal SVsync, the horizontal synchronization signal SHsync may be generated at the point in time of generation of a dot clock SDotclock having a pulse count smaller than the reference pulse count PSD0. As a result, the period until output of the next vertical synchronization signal SVsync (cycle TSV) may made shorter than the reference cycle TSV0.

Each of the processes that were carried out on individual single lines in the preceding embodiment may instead be carried out individual predetermined units such as a plurality of lines or a plurality of pixels.

In the embodiment, the processing for generating image data corresponding to the next frame starts on the basis of progress information that relates to the frame for which the image data generation process is currently being carried out. According to this configuration, acquisition of image-capture data from the image-capturing section can be started under conditions in which preparations are in order for starting the processing for generating the image data for the next frame. As a result, for example, destruction of uncompleted image-capture data by the image data generation process may be prevented.

The image-data-generation section is also preferably capable of generating image data indicating an image of a subject on the basis of image-capture data of an image-capturing section (e.g., an area image sensor), and displaying the image of the subject in the display section on the basis of the image data. The processing for generating image data may be composed of any type of image processing, and the period required for processing may fluctuate according to the image-capture data of the image-capturing section, a mode in the image-capturing device, the image-capturing conditions, or other factors. The period required for processing may also be unknown. In other words, since the progress of the processing for generating image data is dynamically specified by the progress-information-acquiring section, regardless of the type of processing performed, there is no need for the required period thereof to be specified in advance prior to the start of the processing.

It is sufficient for the progress-information-acquiring section to be able to acquire progress information indicating the progress of processing to generate image data for individual predetermined units (e.g., a one line, several lines, several pixels, or the like). In other words, since a predetermined unit for which processing for generating image data is ended can be displayed by the display section, the progress information is preferably defined as information whereby it is possible to determine for individual predetermined units whether the processing for generating image data thereof is ended. Consequently, the progress information may be information directly or indirectly indicating that processing for generating image data is ended for any predetermined unit.

In the former case (direct information), the information may be composed of information indicating that the processing for generating image data of a single line is ended, information indicating that the processing for generating image data which indicate a pixel which is positioned at the end of a single line and is last to be processed is ended, information indicating a line number of a line targeted for the processing for generating image data, or other information, for example. In the latter case (indirect information), in a case in which the processing for generating image data is composed of a plurality of image processing steps, and the steps include a step in which the required period needed for an image processing step dynamically fluctuates, and a step in which the required period is constant, the information may be composed of information indicating that all steps are ended in which the period needed for an image processing step dynamically fluctuates. In other words, since the required period is constant for steps other than steps in which the period needed for an image processing step may dynamically fluctuate, insofar as it can be specified for a certain line whether a step is ended in which the period needed for an image processing step may dynamically fluctuate, it is possible to specify the timing at which the processing for generating image data ends for the certain line. Moreover, individual lines are not limited to individual single lines, and may also be individual groups of several lines.

At a reference timing for outputting a vertical synchronization signal that controls the start of acquisition of image-capture data of the next frame which follows the frame for which the image data generation process is being carried out, the image-capture control section may determine on the basis of progress information whether or not preparations are in order for starting the processing for generating image data corresponding to the next frame in the image-data-generation section; and, in the case that preparations are not in order, may wait until preparations are in order until outputting the vertical synchronization signal. A condition in which preparations are in order for starting the processing for generating image data corresponding to the next frame refers, at a minimum, to a condition such that a situation does not arise in which unprocessed image-capture data (e.g., image-capture data corresponding to lines for which processing by the image-data-generation section has not ended) is overwritten or destroyed by the image-capture data of the next frame. The mode of indicating a condition in which preparations are in order will differ depending on configurations such as the size and number of buffers for storing the image-capture data from the image-capturing section and the like. For example, in a case where y lines of image-capture data are needed to generate data of one line in an image process that is the x-th from the beginning among a plurality of image process steps carried out sequentially by the image-data-generation section for the purpose of generating image data for output to the display section, at the point in time that the x-th image process has ended, and reference to the generated data for the process x+1-th image process and use thereof in processing has ended, the image-capture data equivalent to y lines used in the x-th image process is no longer needed. Consequently, the image-capture data equivalent to y lines in question may be overwritten or destroyed by the data of the next frame. A situation in which such overwriting or destruction is acceptable is one example of a situation in which preparations are in order for acquiring the image-capture data of the next frame and starting the image data generation process.

During the period of waiting for output of the vertical synchronization signal to the image-capturing section, a dummy horizontal synchronization signal may be output to the image-capturing section, or the system may wait without application of a dummy horizontal synchronization signal. In other words, the system may wait for output of the vertical synchronization signal in various modes depending on the specifications of the image-capturing section or the circuit configuration for generating the horizontal synchronization signal.

In addition to the configuration described above, there may be provided a display control section for causing the display section to display a predetermined unit for which it is specified that processing for generating the image data has ended, on the basis of progress information indicating the progress of processing for generating image data in individual predetermined units. According to this configuration, it is possible to minimize the time lag between display of a certain predetermined unit and display of the next predetermined unit, and to shorten the display delay of the subject in the display section.

The display control section is capable of causing the display section to display a predetermined unit for which the progress information specifies that processing for generating image data is ended. In other words, in the case of image data indicating an image of one frame composed of a plurality of lines, the configuration can be such that, if processing for generating image data indicating a given line has not ended, the system waits without displaying the line in question, and starts to display the line in question at the point in time that processing for generating the image data has ended.

The embodiment can be implemented in a timing control circuit in which the progress-information-acquiring section and the image-capture control section described above are realized as circuits, and are provided therein as a progress-information-acquiring circuit and an image capture control circuit.

Furthermore, the procedures taught in the embodiment of specifying, on the basis of progress information for individual lines, whether processing for generating image data has ended and displaying those lines for which the generating process in question has ended, or of adopting variable timing of the vertical synchronization signal for application to the image-capturing section, may be implemented in a program or method. A device, program, or method such as described above may be implemented as an independent device or by utilizing a shared component in a device having multiple functions, and various types of embodiments are included.

According to one aspect of the embodiment, a control device for controlling an image-capturing section which generates image-capture data at a timing on the basis of a vertical synchronization signal comprises an image-data-generation section and a timing generator. The image-data-generation section is configured and arranged to generate image data corresponding to a frame on the basis of image-capture data from the image-capturing section. The timing generator is configured and arranged to output the vertical synchronization signal to the image-capturing section. The timing generator outputs the vertical synchronization signal to the image-capturing section at a variable timing in accordance with a generating condition of the image data corresponding to the frame whereby the image-capturing section generates the image-capture data at the timing on the basis of the vertical synchronization signal.

According to another aspect of the embodiment, an image-capturing device comprises an image-capturing section, an image-data-generation section, a display section, and a timing generator. The image-capturing section is configured and arranged to capture an image of a subject at a timing on the basis of a first vertical synchronization signal inputted and generate image-capture data. The image-data-generation section is configured and arranged to generate image data on the basis of the image-capture data. The display section is configured and arranged to display the image data at a timing on the basis of a second vertical synchronization signal inputted. The timing generator is configured and arranged to output the first vertical synchronization signal and the second vertical synchronization. The timing generator prolongs an outputting cycle of the second vertical synchronization signal when an outputting cycle of the first vertical synchronization signal is prolonged.

According to another aspect of the embodiment, a control device for controlling an image-capturing section which generates image-capture data at a timing on the basis of a first vertical synchronization signal inputted and for controlling a display section which displays image data at a timing on the basis of a second vertical synchronization signal inputted comprises an image-data-generation section and a timing generator. The image-data-generation section is configured and arranged to generate section generates image data on the basis of image-capture data from the image-capturing section. The timing generator is configured and arranged to output the first vertical synchronization signal and the second vertical synchronization signal. The timing generator prolongs an outputting cycle of the second vertical synchronization signal when an outputting cycle of the first vertical synchronization signal is prolonged.

According to another aspect of the embodiment, an image-capturing device comprises an image-capturing section, an image-data-generation section, a display section, and a timing generator. The image-capturing section is configured and arranged to capture an image of a subject at a timing on the basis of a vertical synchronization signal inputted and configured and arranged to generate image-capture data corresponding to a frame. The image-data-generation section is configured and arranged to generate image data on the basis of the image-capture data corresponding to the frame. The display section is configured and arranged to display the image data. The timing generator is configured and arranged to output the vertical synchronization signal. The timing generator outputs the vertical synchronization signal at a variable timing in accordance with a generating condition of the image data corresponding to the frame. The image-capturing section generates the image-capture data corresponding to another frame at the timing on the basis of the vertical synchronization signal.

What is claimed is:

1. An image-capturing device comprising:
    an image sensor that outputs image-capture data of a subject;
    a first processor that receives the image-capture data, carries out a first processing for the image-capture data, and outputs first processing data;
    a second processor that receives the first processing data, carries out a second processing for the first processing data, and outputs second processing data; and
    a display that receives the second processing data and displays based on the second processing data, wherein
    the image sensor outputs the image-capture data by a predetermined unit,
    the first processor starts the first processing after preparation of the image-capture data of the lowest necessary number of the predetermined unit for executing the first processing is finished,
    the second processor starts the second processing after preparation of the first processing data of the lowest necessary number of the predetermined unit for executing the second processing is finished, and
    the display starts to display data of a single line based on the second processing data.

2. The image-capturing device according to claim 1, wherein
    the image sensor outputs the image-capture data at a first timing,
    the first processor outputs the first processing data at a second timing after the first timing,
    the second processor outputs the second processing data at a third timing after the second timing,
    the display displays the data of the single line based on the second processing data at a fourth timing, and
    a period from the first timing to the fourth timing is less than or equal to a vertical synchronization period of the image sensor.

3. The image-capturing device according to claim 1, wherein
    the image sensor outputs the image-capture data at a first timing,
    the first processor outputs the first processing data at a second timing after the first timing,
    the second processor outputs the second processing data at a third timing after the second timing,
    the display displays the data of the single line based on the second processing data at a fourth timing, and
    a period from the first timing to the fourth timing is less than or equal to a vertical synchronization period of the display.

4. The image-capturing device according to claim 1, wherein
    the first processor does not start the first processing before preparation of the image-capture data of the lowest necessary number of the predetermined unit for executing the first processing is finished, and
    the second processor does not start the second processing before preparation of the first processing data of the lowest necessary number of the predetermined unit for executing the second processing is finished.

5. The image-capturing device according to claim 1, wherein
    the first processor executes at least one of a pixel interpolation processing, a color reproduction processing, a filter processing, a gamma correction processing, and a resizing processing, and the second processor executes at least one of the pixel interpolation processing, the color reproduction processing, the filter processing, the gamma correction processing, and the resizing processing, which is different from the at least one that the first processor executes.

6. An image-capturing device comprising:
an image sensor that outputs image-capture data of a subject;
an image processor that receives the image-capture data, carries out a first image processing for the image-capture data, outputs first image data, carries out a second image processing for the first image data, and outputs second image data; and
a display that receives the second image data and displays based on the second image data, wherein
the image sensor outputs the image-capture data by a predetermined unit,
the image processor starts the first image processing after preparation of the image-capture data of the lowest necessary number of the predetermined unit for executing the first image processing is finished, and starts the second image processing after preparation of the first image data of the lowest necessary number of the predetermined unit for executing the second image processing is finished, and
the display starts to display data of a single line based on the second image data.

7. The image-capturing device according to claim 6, wherein
the image sensor outputs the image-capture data at a first timing,
the image processor outputs the first image data at a second timing after the first timing, and outputs the second image data at a third timing after the second timing,
the display displays the data of the single line based on the second image data at a fourth timing, and
a period from the first timing to the fourth timing is less than or equal to a vertical synchronization period of the image sensor.

8. The image-capturing device according to claim 6, wherein
the image sensor outputs the image-capture data at a first timing,
the image processor outputs the first image data at a second timing after the first timing, and outputs the second image data at a third timing after the second timing,
the display displays the data of the single line based on the second image data at a fourth timing, and
a period from the first timing to the fourth timing is less than or equal to a vertical synchronization period of the display.

9. The image-capturing device according to claim 6, wherein
the image processor does not start the first image processing before preparation of the image-capture data of the lowest necessary number of the predetermined unit for executing the first image processing is finished, and does not start the second image processing before preparation of the first image data of the lowest necessary number of the predetermined unit for executing the second image processing is finished.

10. The image-capturing device according to claim 6, wherein the image processor executes at least two of a pixel interpolation processing, a color reproduction processing, a filter processing, a gamma correction processing, and a resizing processing.

* * * * *